United States Patent [19]

Smith et al.

[11] 4,052,702
[45] Oct. 4, 1977

[54] CIRCUIT FOR INTERFACING MICROCOMPUTER TO PERIPHERAL DEVICES

[75] Inventors: Kay D. Smith, Salt Lake City; Arjun S. Bachass, Kaysville; Francis B. Black, Sandy, all of Utah

[73] Assignee: Kenway Incorporated, Bountiful, Utah

[21] Appl. No.: 684,616

[22] Filed: May 10, 1976

[51] Int. Cl.² .......................... G06F 3/00; G06F 5/04
[52] U.S. Cl. ................................................. 364/200
[58] Field of Search .................. 340/172.5; 235/150; 178/50; 179/15 BA, 15 BV

[56] References Cited
U.S. PATENT DOCUMENTS

| | | | |
|---|---|---|---|
| 3,573,751 | 4/1971 | DeLisle | 340/172.5 |
| 3,588,348 | 6/1971 | Bowling | 179/15 BV |
| 3,828,325 | 8/1974 | Stafford et al. | 340/172.5 |
| 3,833,888 | 9/1974 | Stafford et al. | 340/172.5 |
| 3,950,735 | 4/1976 | Patel | 340/172.5 |
| 3,975,712 | 8/1976 | Hepworth et al. | 179/15 BA |

*Primary Examiner*—Gareth D. Shaw
*Assistant Examiner*—Thomas M. Heckler
*Attorney, Agent, or Firm*—H. Ross Workman; J. Winslow Young

[57] ABSTRACT

A microcomputer for controlling an automated materials handling system, the microcomputer having a novel interface circuit permitting direct interface with a wide variety of peripheral devices, both serial and parallel and at any one of a variety of communication rates selected to maximize machine efficiency under a wide range of noise conditions. A safety relative timer circuit terminates operation of the machine if the S/R machine does not complete a task within a predetermined time increment.

19 Claims, 12 Drawing Figures

CIRCUIT FOR INTERFACING MICROCOMPUTER TO PERIPHERAL DEVICES

BACKGROUND

1. Field of the Invention

The present invention relates to materials handling systems and more particularly to a novel microcomputer for controlling the operation of an S/R machine and accommodating interface of the microcomputer with a variety of peripheral devices.

2. The Prior Art

The need of industry for efficient and economic materials handling systems has long been recognized. Relatively recent efforts directed towards solving the problems associated with industrial materials handling have led to the development and use of computer-controlled warehousing systems. Computer-controlled warehousing has provided an economical solution to many of the problems associated with industrial materials handling.

Typically, the heart of a computer-controlled materials handling system is the digital computer used to control the overall warehouse operation. The primary functions of the computer controller are to receive instructions from external sources, convert the instructions from external sources into commands utilized by a storage-retriever (S/R) machine interfaced to the computer, and to send information pertaining to the execution of the instructions by the computer-controlled S/R machine as well as information as to the status and location of the materials handled to one or more operators via peripheral devices also interfaced to the computer controller. Examples of such peripheral devices are card readers, tape drives, CRT terminals, teletype printers and so forth.

The use of computer controllers as described above is well known in the art of automated materials handling systems. One type of computer controller utilized is a microcomputer located at the end of each storage aisle. See, for example, U.S. Pat. No. 3,880,299.

Typically, this type of microcomputer is specifically wired to control the operation of an S/R machine according to a predetermined program. Furthermore, the microcomputer is also typically wired to communicate with a predetermined number and kind of peripheral device. Once the microcomputer has been so wired, any additional interfacing to other devices or any change in the type of device interfaced to the microcomputer requires that the microcomputer be rewired.

Peripheral devices such as those listed above may communicate with a microcomputer in one of two ways: by serial transmission (where the bits of a character, byte or word are transmitted sequentially over a single wire) or by parallel transmission (where the bits of a character, byte or word are transmitted simultaneously over a plurality of separate wires).

Although interfacing to a serial mode peripheral device is more expensive than to interface to a parallel mode peripheral device, remote peripheral devices can communicate practically only over a serial channel. It has been found that where distortion from environmental noise is high, serial transmission of information is much more accurate, particularly over longer distances. The accuracy of serially transmitted information can be further improved by transmitting the bits of each character at a frequency which is best suited to the particular distance over which the information must be transmitted.

Currently, it is standard industry practice to build each serially communicating peripheral device such that it will send and receive information only at one of several standard rates. The frequency at which the bits of a character are transmitted is known as the baud rate. Present industry standard baud rates are 110, 150, 300, 1200, 1800, 2400, 4800 and 9600 bits per second.

Significantly, until this present invention, it was not possible to alter the number of peripheral devices interfaced to a microcomputer or to change from a serially communicating device to a parallel communicating device or to change to a serially communicating device with a different baud rate without rewiring the microcomputer. Thus, the provision of a novel microcomputer interface circuit permitting direct interface with a wide variety of peripheral devices, both serial and parallel and at any one of a variety of standard baud rates selected so as to minimize noise interference, would greatly enhance the flexibility of a computer-controlled materials handling system.

Historically, if the S/R machine malfunctioned in the process of carrying out its computer-controlled tasks, serious risk of machine damage or personal injury existed. For example, if the S/R machine extractor became disabled in the course of removing a load from high-rise storage, the S/R machine could be moved vertically or horizontally while the extractor was still projecting into a storage bay. Thus, significant damage to the system could result. Safety of the system could be improved by providing the microcomputer with a relative time circuit that automatically triggers shutdown of an S/R machine if the machine does not complete a designated task within a predetermined time increment.

BRIEF SUMMARY AND OBJECTS OF THE INVENTION

The present invention, as indicated by the described preferred embodiments, comprises novel apparatus and method for interfacing a microcomputer for controlling a materials handling system to a plurality of both serial and parallel channel peripheral devices. The microcomputer of the present invention makes possible selective communication with any one of several parallel or serial-channel peripheral devices interfaced to the microcomputer. Communication with a serial-channel device may occur at any one of the eight standard baud rates presently utilized in the industry. Apparatus of the present invention also provides for a relative time circuit that automatically triggers shutdown of a storage-retriever machine in the event that the machine fails to complete an assigned task within a predetermined time increment.

It is therefore a primary object of the present invention to provide a novel circuit and method for interfacing a microcomputer to a plurality of both serial and parallel-channel peripheral devices.

It is another primary object of the present invention to provide for apparatus and method accommodating selective communication between the CPU of a microcomputer and one of the serial or parallel-channel peripheral devices interfaced to the microcomputer.

It is yet another primary object of the present invention to provide apparatus and method accommodating selective communication between a CPU of a microcomputer and one of a plurality of serial-channel peripheral devices at any one of several baud rates independently.

One further object of the present invention is to provide for a circuit and method of monitoring an S/R machine so as to determine when an assigned task has not been completed within a predetermined time increment, and thereafter indicating the S/R machine failure.

These and other objects and features of the present invention will become more fully apparent from the following description and appended claims taken in conjunction with the accompanying drawings.

BRIEF DESCRIPTION OF THE DRAWINGS

FIG. 6 illustrates the baud rate generator and baud rate selection portion of the interface circuit. FIG. 7 illustrates the portion of the interface circuit which provides for serial-channel communication with peripheral devices. FIG. 8 illustrates the portion of the interface circuit which provides for addressing and enabling of the various serial and peripheral channels. FIG. 9 illustrates the portion of the interface circuit which provides for parallel-channel communication with peripheral devices.

DETAILED DESCRIPTION OF THE PREFERRED EMBODIMENTS

1. General Description of the Microcomputer and Materials Handling System

In order to more fully understand the method and apparatus of the microcomputer of the present invention, attention is focused briefly on a general description of a materials handling system which may be controlled by the microcomputer.

Figure 1:
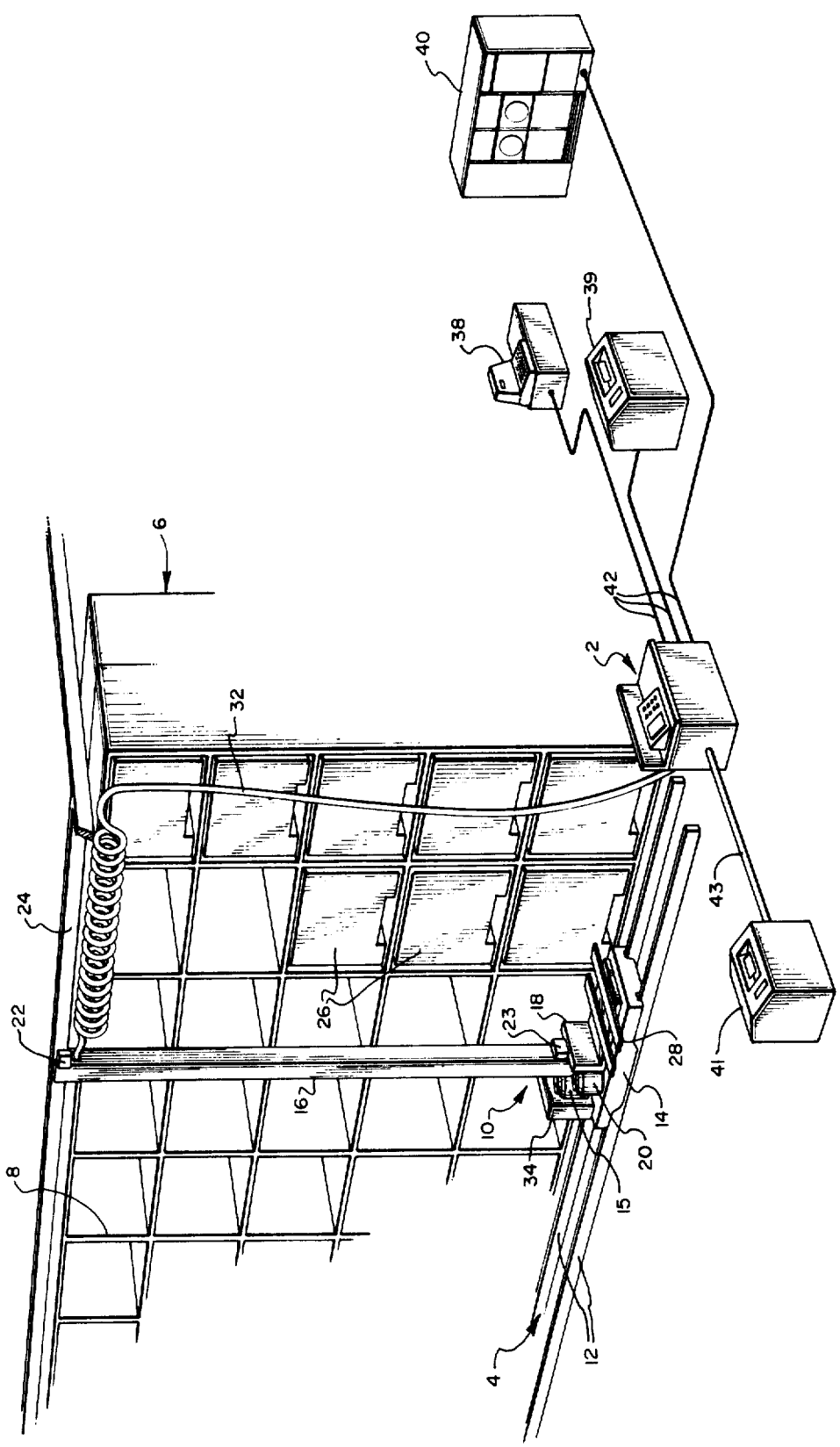
FIG. 1 is a perspective illustration of an automated materials handling system also illustrating a microcomputer interfaced to a plurality of peripheral devices.

FIG. 1 illustrates schematically the basic components of a materials handling system and a microcomputer generally designated 2 for controlling the materials handling system. As shown in FIG. 1, the microcomputer 2 is located at the end of a storage aisle generally designated 4. A high-rise storage assembly generally designated 6 composed of individual bays 8 is located on each side of the aisle 4. For convenience, only one high-rise storage assembly 6 has been shown in FIG. 1.

A storage-retriever (S/R) machine generally designated 10 is located in the aisle 4 between the high-rise storage assemblies 6. The S/R machine 10 is driven by a DC motor 15 horizontally, along the X-axis of the aisle 4, on tracks shown schematically at 12.

The S/R machine 10 is further comprised of a mast 16 and a lift plate shuttle 18. The lift plate shuttle 18 is driven vertically, along the Y-axis of the mast 16, by a second motor 20 located on the chassis 14 of the S/R machine 10. A horizontal read head 22 is mounted on the top of the mast 16 which is slidably mounted on a rail 24.

The rail 24 is encoded so as to indicate electronically the X-axis position of the S/R machine 10 as the horizontal read head 22 slides along the rail 24. A vertical read head 23 is also mounted on the lift plate shuttle 18 of the S/R machine 10. The mast 16 is encoded similar to the rail 24. As the lift plate shuttle 18 moves along the Y-axis, up and down the mast 16, the vertical read head 23 indicates the Y-axis position of the lift plate shuttle 18. In this manner, the S/R machine 10 may correctly detect and control the position of the lift plate shuttle 18 for insertion or removal of goods from any bay 8 in the high-rise storage assembly 6. However, it should be noted that the read head 22 could be positioned at other locations as for example on the chassis 14 so as to read signals encoded on the tracks 12.

Bins or mini-pallet loads 26 are inserted into or taken out of the storage bays 8 by an extractor 28 rigidly mounted to the lift plate shuttle 18 of the S/R machine 10. The extractor 28 is driven by a motor (not shown) also mounted on the S/R machine 10. The extractor 28 thus provides for Z-axis position control of the load 26.

As is further illustrated in FIG. 1, the S/R machine 10 is electrically connected to the microcomputer 2 through a festoon cable 32. The festoon cable 32 connects the on-board controls housed at 34 of the S/R machine 10 to the off-board controls 48–54 (see FIGS. 2 and 3) of the microcomputer 2 through parallel channels (not shown) of the festoon cable 32. However, it should be understood that a slide-rail or serial channel interconnection could also be used.

High-rise storage assemblies and S/R machines as described above which are suitable for operation with the microcomputer of the present invention are manufactured by Kenway Inc. of Salt Lake City, Utah under the name Kenway Mini-Load Storage System.

Figure 3:
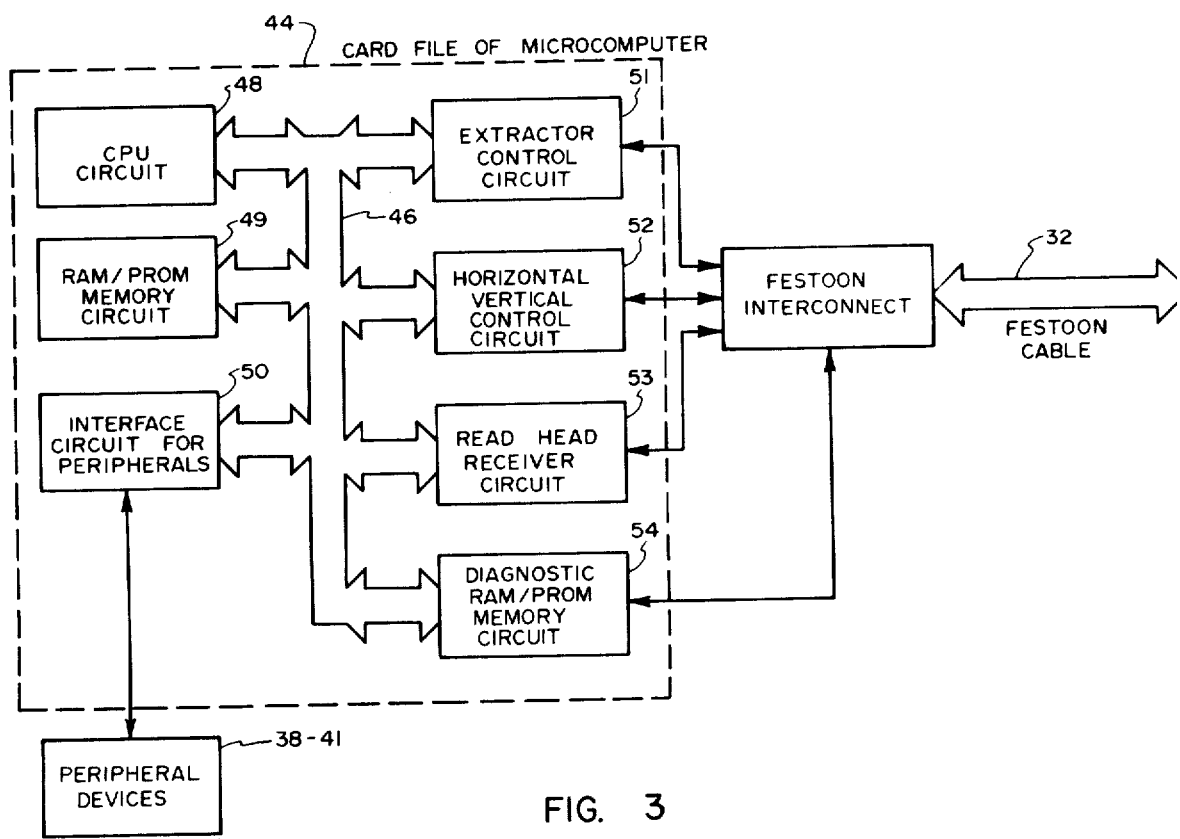
FIG. 3 is a block diagram illustrating the functional components of the off-board controls of the microcomputer of FIG. 1 and their interconnection with various other external components of the materials handling system.

Reference is now made to FIG. 3 which illustrates the off-board controls 48–54 of the microcomputer 2. A card file represented by the broken-line box 44 contains the microcomputer 2. The card file 44 houses a mother board (not shown) into which each of the printed circuit boards (PC boards) 48–54 is plugged. When plugged into the mother board, communication between the various PC boards 48–54 occurs through a main bus of the mother board represented by the path 46. As shown in FIG. 3, external communication with the off-board controls housed in the card file 44 may originate with the S/R machine 10 through the festoon cable 32 or with any one of several peripheral devices 38–41.

As further illustrated in FIG. 1, the microcomputer 2 is connected electrically through serial-channel cables 42 to a CRT keyboard terminal 38, a teletype printer 39 and a tape drive 40. The microcomputer is also connected electrically through a parallel-channel cable 43 to a peripheral card reader 41. The peripheral devices 38–41 are merely illustrative, and it should therefore be understood that the microcomputer of the present invention could be interfaced to any type of serial or parallel-channel peripheral device.

When the microcomputer 2 communicates over the serial-channel cables 42 with one of the peripheral devices 38–40, the bits (binary digits) of the character (a combination of bits, usually 8) are sent sequentially. When the microcomputer 2 communicates over the parallel-channel cable 43 with the peripheral device 41, all the bits of the character are sent simultaneously over separate wires (not shown) in the cable 43.

Due to the high degree of noise inherent in warehousing operations such as the type described above, where peripheral devices such as 38–40 are located at some distance from the microcomputer 2, substantial problems are encountered with respect to distortion from environmental noise. Distortion of information communicated between the microcomputer 2 and peripheral devices 38–40 tends to interfere with the efficient operation of the materials handling system. As will be hereinafter more fully described, the effects of distortion from environmental noise are reduced by (1) sending the information over a serial channel and (2) by regulating the rate at which the bits of a character are sent (known as the baud rate).

Figure 2:
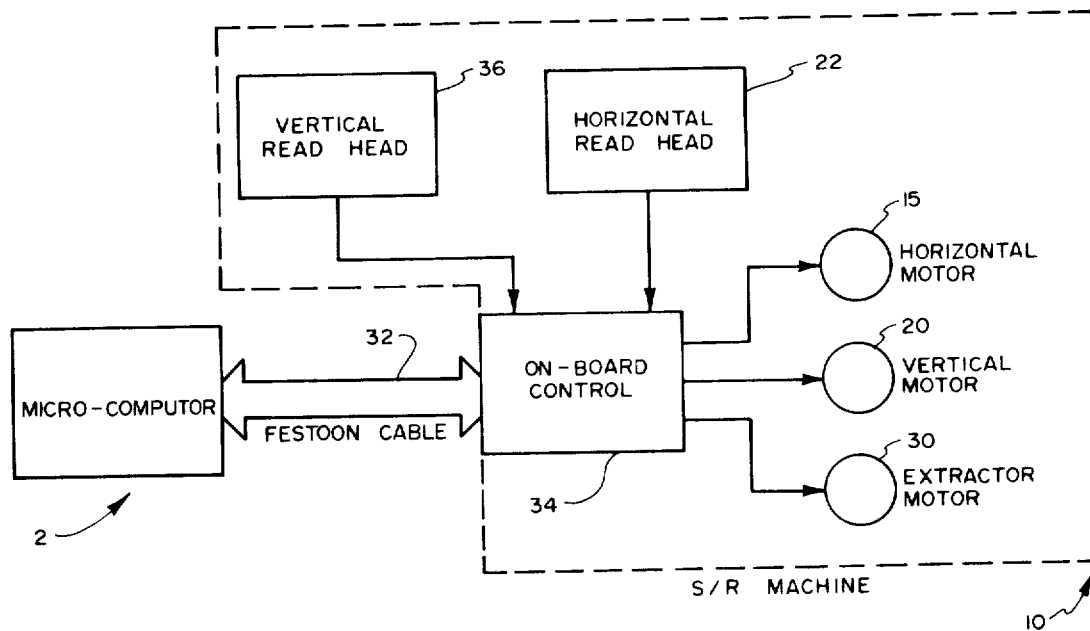
FIG. 2 is a block diagram illustrating the interconnection between the microcomputer of FIG. 1 and the components of the on-board controls of the stacker-retriever machine of FIG. 1.

Turning now to a general description of how the microcomputer 2 controls the S/R machine 10, reference is made to the block diagrams of FIGS. 2 and 3. A storage or retrieval command may be entered into the microcomputer 2 through one of the peripheral devices 38–41 (see also FIG. 1). If the storage or retrieval command is entered from a peripheral device 38–41, it is received by the interface circuit for peripherals generally designated 50 and transmitted through the main bus 46 of the mother board to the CPU circuit 48. It should be further noted that the card file 44 of the microcomputer 2 may contain up to seven interface circuits 50. Thus, the CPU 48 may communicate with peripheral devices such as 38–41 interfaced through any one of seven different interface circuits 50.

After having received a storage or retrieval command, the CPU 48 must then retrieve the appropriate instructions from the main program contained in the RAM/PROM memory circuit 49 so as to enable the CPU 48 to execute the storage or retrieval command.

Figure 4:
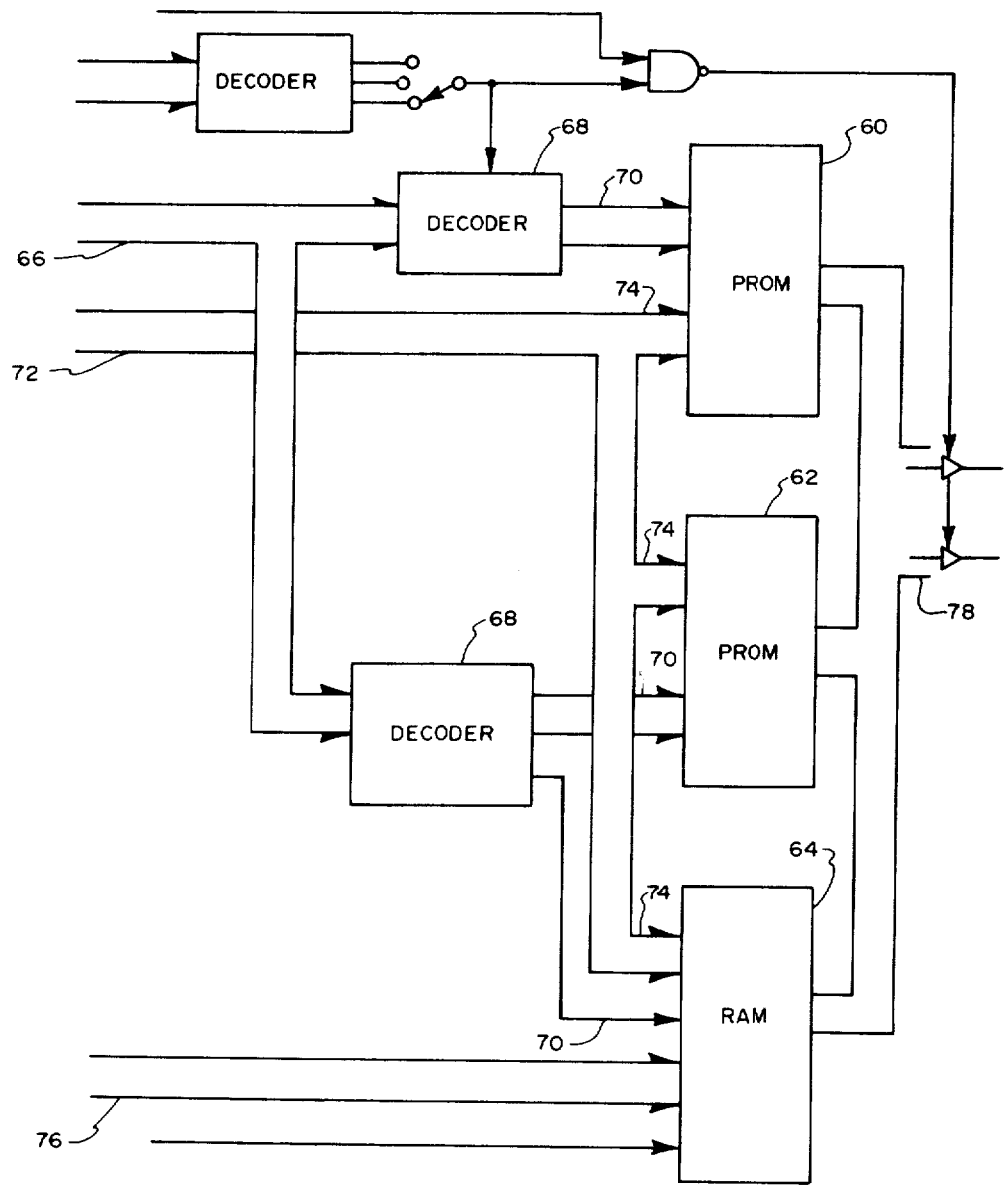
FIG. 4 is a schematic diagram illustrating the CPU memory circuit.

As more clearly illustrated in FIG. 4, the memory circuit 49 of FIG. 3 is comprised of basically two types of memory. Two integrated circuits (IC's) 60 and 62 provide for memory storage for the main operating program of the CPU. Integrated circuits 60 and 62 are of the type designated programmable read only memory (PROM), and are commercially available from several manufacturers. The PROMS 60 and 62 contain the main program instructions. Once programmed, the contents of the two PROMS 60 and 62 remain constant. Thus, after the two PROMS 60 and 62 have been programmed, they are utilized by the CPU 48 only to output the proper instruction which the CPU 48 is to next execute. Data regarding the location and type of goods which are to be retrieved or stored and instructions regarding vehicle commands are stored in the random access memory 64 (RAM). The RAM 64 is also a commercially available IC.

Thus, the CPU 48 of FIG. 3 executes the storage or retrieval command by sequentially retrieving and executing instructions from the PROMS 60 and 62 and the RAM 64. In order to retrieve instructions from the memory circuit 49, the CPU will enter a memory address signal at 66 which is then sent to decoders 68. The memory address signals 66 are then decoded and transmitted at 70 to the PROMS 60 and 62 and the RAM 64. Instruction address signals are entered by the CPU 48 at 72 and transmitted to each of the respective memories 60, 62 and 64. Data concerning the type and location of the goods to be stored or retrieved is entered into the RAM 64 at 76. In response to the memory and instruction address signals entered into each of the memories 60, 62 and 64, appropriate instructions are retrieved from either the PROM 60, the PROM 62 or the RAM 64 and are sent back to the CPU 48 via the main bus 46 of the mother board. Once the appropriate instruction has been received by the CPU 48, it then signals the horizontal-vertical control circuit 52 (see FIG. 3). In turn, the horizontal-vertical control circuit 52 transmits the signals received from the CPU 48 through the festoon cable 32 to the on-board control 34 (see FIG. 2). The horizontal motor 15 and the vertical motor 20 are then activated so as to move the S/R machine 10 and the lift plate shuttle 18 in the X and Y axis directions to the appropriate storage bay 8 (see FIG. 1).

As the S/R machine 10 and lift plate shuttle 18 move in the X and Y axis directions, horizontal read head 22 and vertical read head 36 monitor the X and Y positions of the S/R machine 10 and lift plate shuttle 18. This information regarding the X and Y positions of the S/R machine 10 and lift plate shuttle 18 is transmitted through the on-board control 34 back through the festoon cable 32 to the read head receiver control circuit 53. When the appropriate bay 8 is reached, the horizontal-vertical control circuit 52 signals the CPU 48 that the appropriate storage bay 8 has been located. CPU 48 then signals the extractor control circuit 51 that the goods are to be either stored or retrieved as commanded. The extractor control circuit 51 then transmits this instruction through the festoon cable 32 to the on-board control 34 which causes the extractor motor (not shown) to operate the Z-axis extractor 28, thereby causing the goods to be either extracted or inserted as commanded.

In this manner, the on-board control 34 of the S/R machine 10 and the off-board controls 48–54 of the microcomputer 2 cooperate to carry out the warehouse operations of storage and retrieval.

Having now generally described a typical application of the microcomputer of the present invention in controlling a materials handling system, attention is now directed toward a detailed description of the preferred embodiments of the circuit and method for interfacing the microcomputer of the present invention to a plurality of both serial and parallel-channel peripheral devices.

2. The Interface Circuit for Peripherals

As noted above, the interface circuit 50 of the microcomputer 2 (see FIG. 3) makes possible selective communication between the CPU circuit 48 (FIG. 3) and any one of a plurality of both serial-channel and parallel-channel devices 38–41 (FIGS. 1 and 3). This greatly enhances the flexibility of the microcomputer 2 of the present invention. As described more fully in following portions of the specification, various numbers and types of peripheral devices such as 38–41 of FIG. 1 may be added to or deleted from the materials handling system without having to internally rewire the microcomputer 2. Furthermore, since the microcomputer 2 can be interfaced to any type of serial or parallel-channel peripheral device as described above, those who use the microcomputer 2 in different industries may each use the microcomputer 2 to tailor-make a materials handling system according to their specific needs. Thus, because of its novel interface circuit 50, the microcomputer 2 is capable of servicing the individual needs of a large variety of industrial users without having to modify the wiring of the microcomputer 2.

Referring now to FIGS. 6-9, attention is turned to the method and circuit for interfacing the microcomputer of the present invention as described above to a plurality of both serial and parallel-channel peripheral devices.

A. General Description of the Interface Circuit and Method

Figure 6:
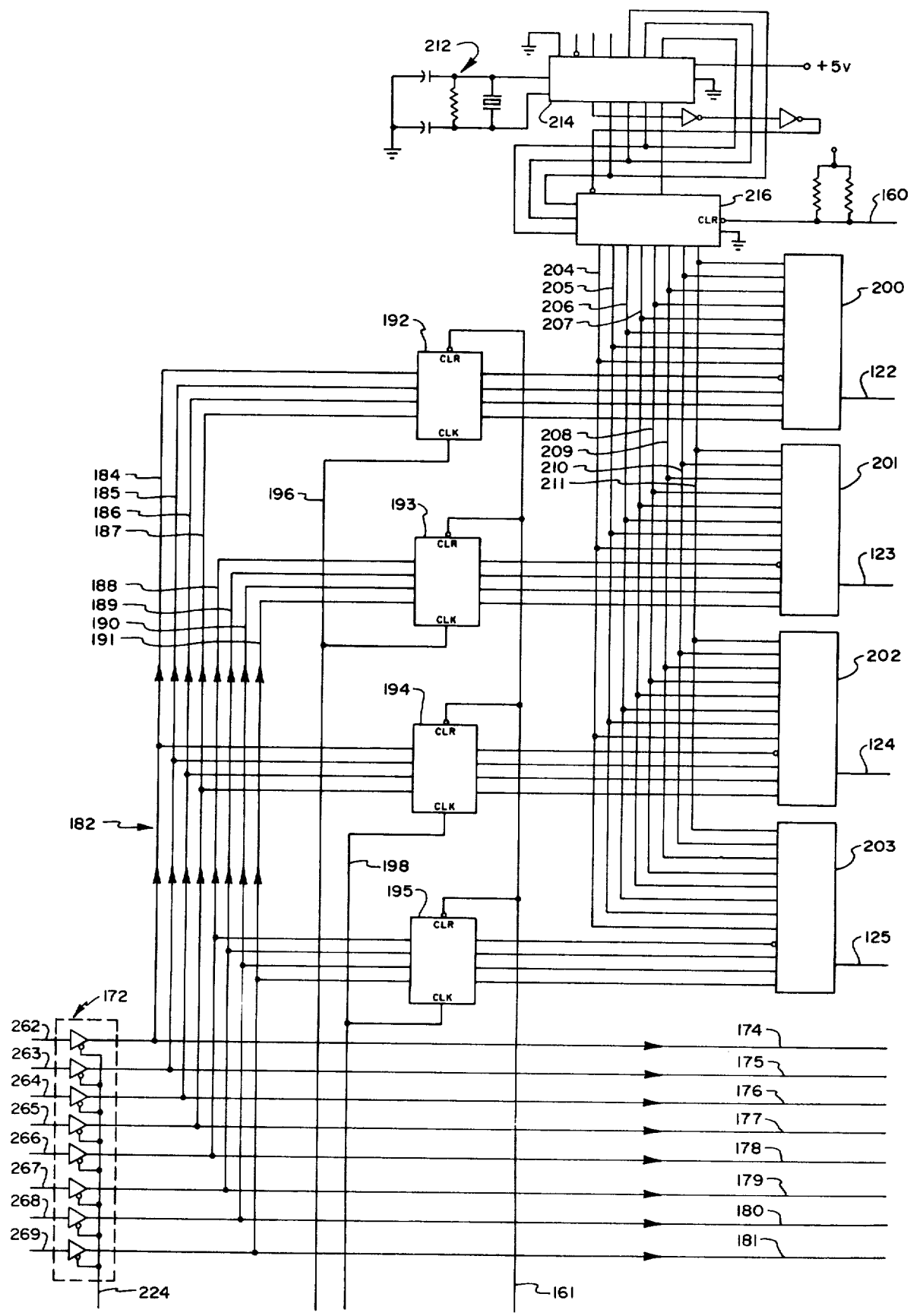
FIGS. 6, 7, 8 and 9 are wiring diagrams of portions of the interface circuit for peripherals, having parts of the circuit shown schematically.
Figure 7:
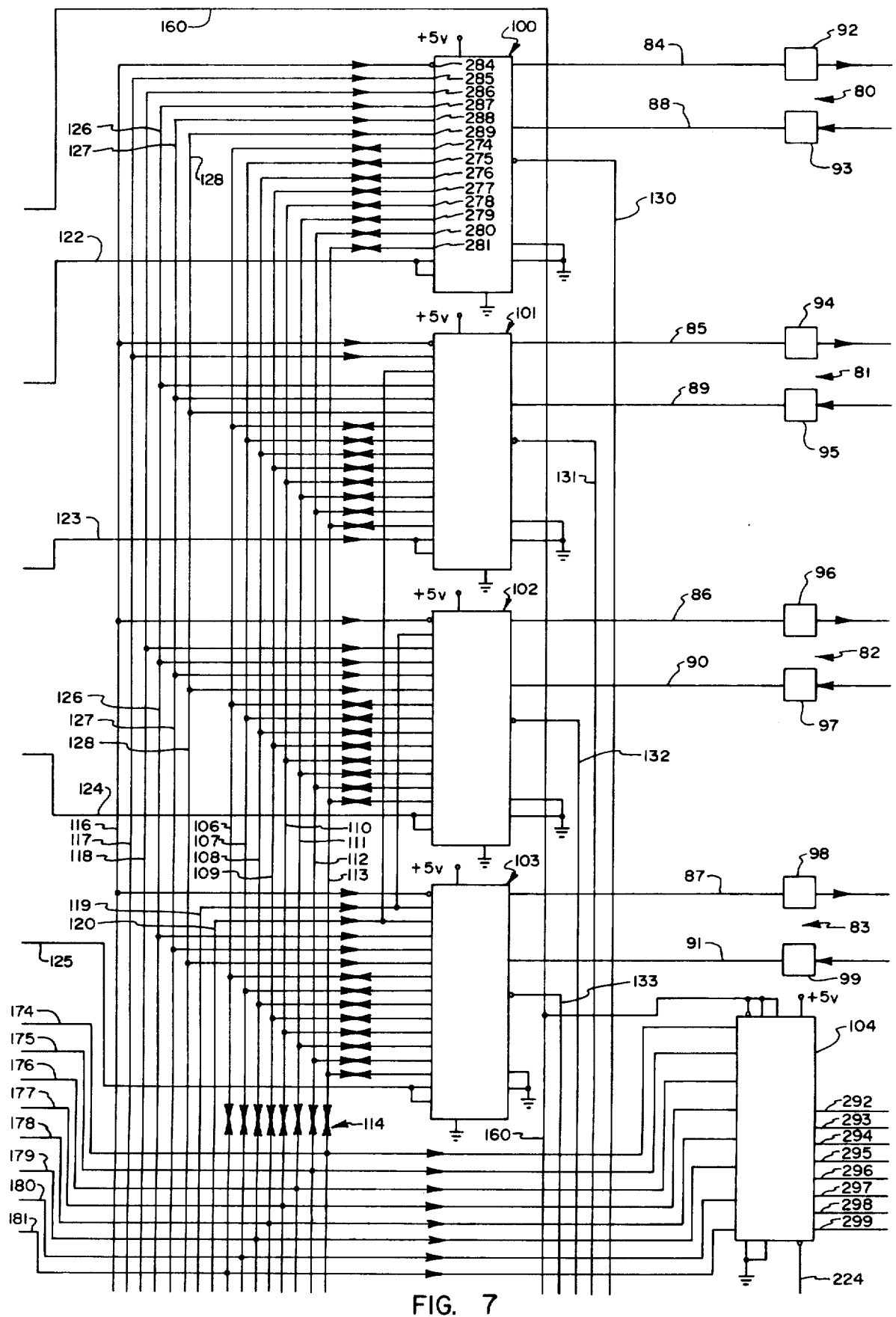
Figure 8:
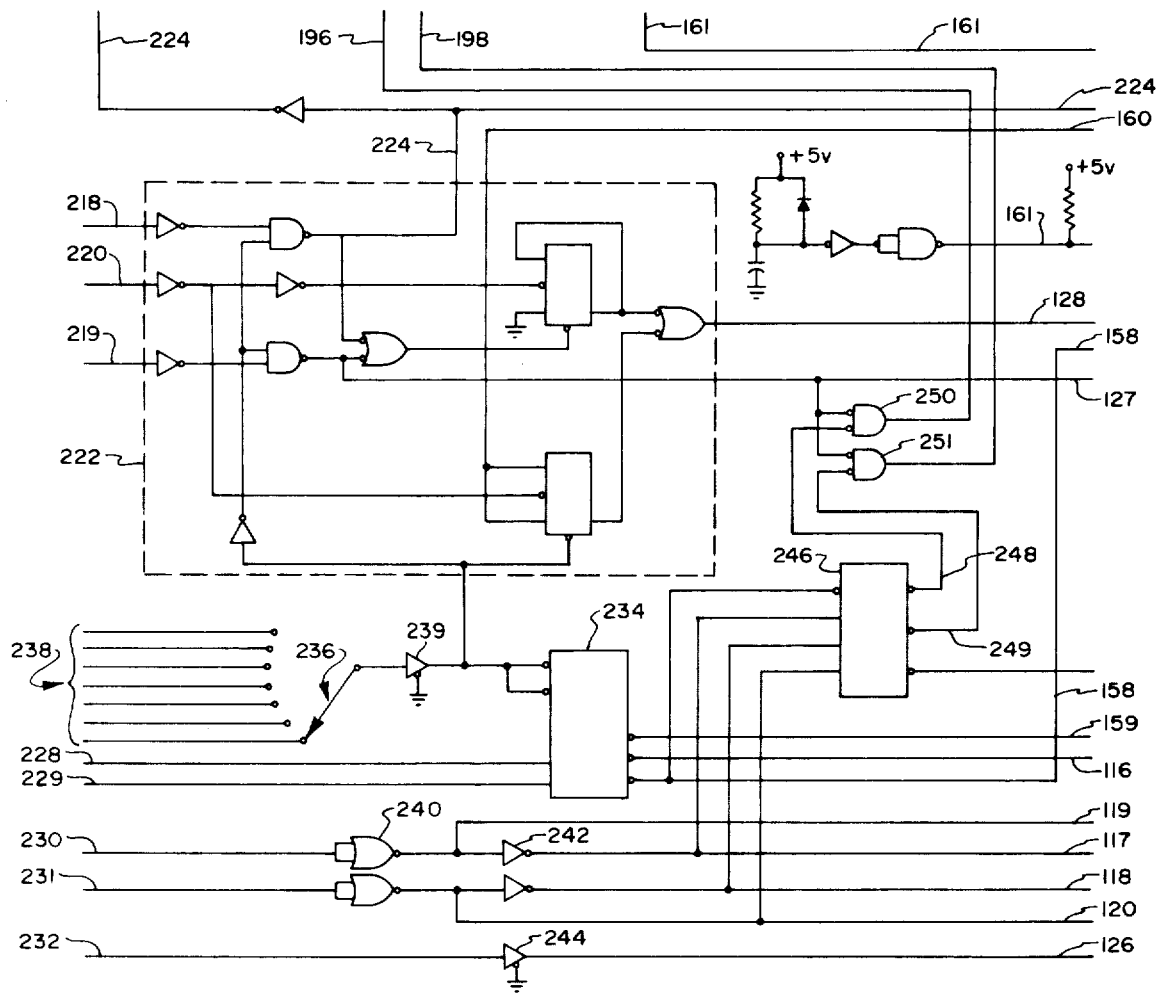
Figure 9:
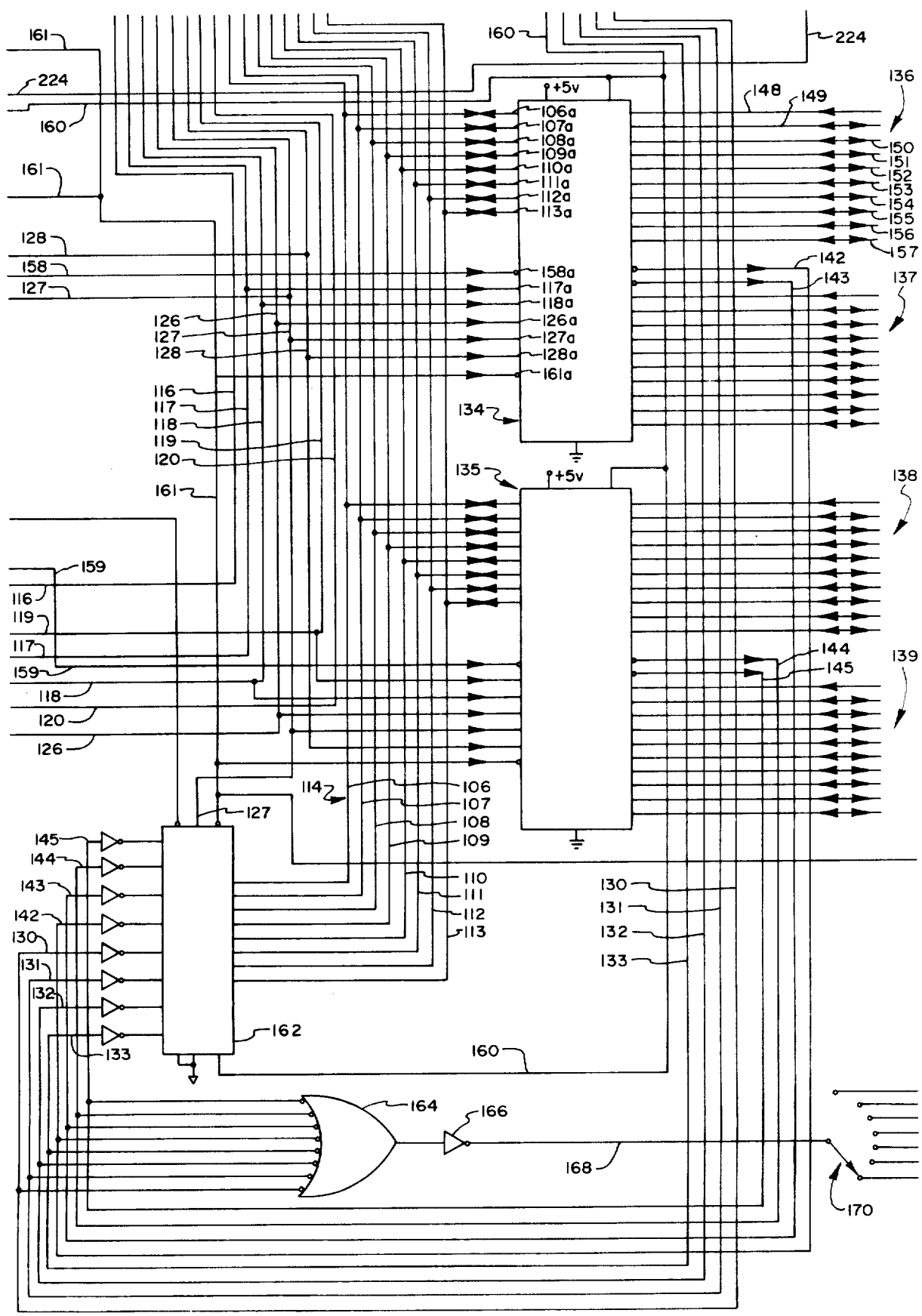
Figure 10:
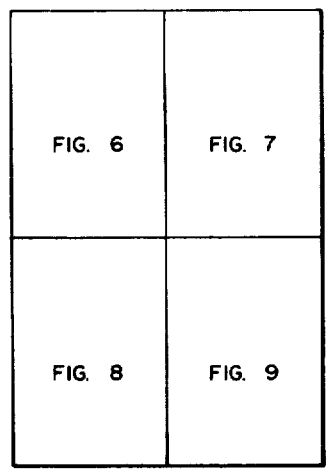
FIG. 10 illustrates the physical relationships of the portions of the interface circuit depicted by FIGS. 6–9.

FIG. 10 illustrates the way in which the four portions of the interface circuit 50 of FIGS. 6-9 are physically connected. The interface circuit 50 is built entirely on a single PC board. However, to facilitate illustration, the wiring diagram of the interface circuit 50 has been illustrated in four portions. FIG. 6 illustrates the baud rate generator and baud rate selection circuitry. FIG. 7 illustrates the serial-channel interface circuitry. FIG. 8 illustrates the timing synchronization and channel addressing circuitry. FIG. 9 illustrates the parallel-channel interface circuitry.

Referring now to FIG. 7, the interface circuit 50 provides for four serial channels generally designated 80-83. Serial channels 80-83 are further comprised of wires 84-87 for transmitting data and wires 88-91 for receiving data. Serial channels such as 80-83 which utilize separate wires for both transmitting and receiving data are known as full duplex channels. It should be understood that the interface circuit 50 could also utilize half duplex channels where the data would be sent and received over one wire. As will be hereinafter more fully described, each of the wires 84-91 is connected to a photo coupler 92-99 which optically isolates the serial channels 80-83 so as to decrease the effects of distortion from environmental noise.

The serial channels 80-83 are also connected to asynchronous communication interface adaptors (integrated circuits) generally designated 100-103. Again, as will be hereinafter more fully described in connection with FIG. 11, each of the integrated circuit adaptors 100-103 contains circuitry that accommodates conversion of characters in parallel format to characters in serial format and vice versa. The adaptors 100-103 are commercially available and are manufactured by Motorola under the name XC6850 Asynchronous Communication Interface Adaptor. Integrated circuit chip 104 is an eight bit character buffer used for holding information until the CPU 48 is prepared to receive it. Information in parallel format is communicated from the interface circuit 50 to the main bus 46 (FIG. 3) of the mother board (not shown) by wires 292-299 connected to the character buffer 104. The character buffer 104 is a commercially available Intel 8212 integrated circuit.

As further illustrated in FIG. 7, each of the adaptors 100-103 is connected to wires 106-113. The wires 106-113 are part of a data bus generally designated 114 which is used to communicate an eight bit character in parallel format to and from the adaptors 100-103.

Each of the serial-channel adaptors 100-103 is connected to a preselected combination of three out of five IC selection wires 116-120. By causing signals to be sent on a preselected combination of three of the wires 116-120, the CPU 48 may select any one of the four serial-channel adaptors 100-103 for transmitting or receiving data.

Each of the adaptors 100-103 is also connected to one of four baud rate wires 122-125. As more fully described in connection with FIG. 6, the baud rate wires 122-125 are used to transmit the baud rate at which the bits of a character will be sent over the serial channels 80-83.

As further illustrated in FIG. 7, each of the serial-channel adaptors 100-103 is connected to two data direction wires 126-127 and one enable wire 128. The data direction wires 126-127 are utilized by the CPU 48 to signal the directional flow of data from the CPU 48 to one of the serial-channel adaptors 100-103 or from a serial-channel adaptor 100-103 to the CPU 48. Enable wire 128 is used to clock data into and out of the adaptors 100-103 in synchronization with the clock pulses of the CPU 48.

It should also be noted that each of the serial-channel adaptors 100-103 is capable of generating a CPU interrupt signal that is carried by one of the interrupt request wires 130-133. Interrupt request signals are sent by the serial-channel adaptors 100-103 on wires 130-133 when information is ready to be transmitted to the CPU 48.

Having generally described the portion of the interface circuit 50 that is designed to accommodate communication over serial channels, attention is now turned to FIG. 9 which illustrates the portion of the interface circuit 50 designed to accommodate parallel-channel communication with peripherals.

As illustrated in FIG. 9, the wires 106-113 of the data bus 114 which, as discussed in connection with FIG. 7, transmits data to and from serial-channel adaptors 100-103 is also connected to each of the two parallel-channel interface adaptors (integrated circuits) generally designated 134 and 135. The data bus 114 communicates eight bit characters in parallel format to and from the parallel-channel adaptors 134-135. As hereinafter more fully described in connection with FIG. 12, the parallel-channel adaptors 134-135 contain circuitry for accommodating communication of eight bit characters from the CPU 48 to various parallel-channel peripheral devices such as 41 (FIGS. 1 and 3). The parallel-channel adaptors 134-135 are commercially available and are manufactured by Motorola under the name MC6820 Peripheral Interface Adaptor.

As further illustrated in FIG. 9, interface circuits 134 and 135 are each connected to two of four parallel-channels generally designated 136-139. Each of the parallel channels 136-139 may be connected to a separate peripheral device such as 41 (see FIGS. 1 and 3). Each of the parallel-channel adaptors 134 and 135 is also connected to two of four CPU interrupt wires 142-145. Each of the CPU interrupt wires 142-145 is associated with one of the four parallel channels 136-139 and is used to indicate that information has been received on one of the corresponding parallel channels 136-139 and is ready to be sent to the CPU 48.

As shown in FIG. 9, parallel channel 136 is further comprised of ten wires 148-157. It should be understood that each of the other parallel channels 137-139 is essentially identical to parallel channel 136. Thus, for purposes of simplification, only the wires 148-157 of parallel channel 136 will be described. Two of the wires 148 and 149 are used as control wires. As more fully described in connection with FIG. 12, control wires 148 and 149 are used to trigger interrupt signals which are subsequently transmitted by interrupt wire 142 as described above. The remaining eight wires 150–157 of parallel channel 136 are bi-directional data wires utilized to transmit eight bit characters in parallel format to and from the integrated circuit adaptor 134.

Each of the parallel-channel adaptors 134 and 135 is connected to a preselected combination of two out of four adaptor selection wires 158, 159, 117, and 119. As more fully described in subsequent portions of the specification, by causing signals to be sent on a preselected combination of two of the wires 158, 159, 117 and 119, the CPU 48 (FIG. 3) may select one or the other of parallel-channel adaptors 134 and 135. Furthermore, adaptors 134 and 135 are each connected to IC selection wire 118 and data direction wires 126 and 127 which were discussed previously in connection with FIG. 7. However, in contrast to their use by the serial-channel adaptors 100–103, the parallel-channel adaptors 134 and 135 utilize the IC selection wire 118 and data direction wire 126 to receive signals from the CPU 48 that determine which of the four parallel channels 136–139 will be used to transmit the information received on data bus 114. The data direction wire 127 is utilized by the parallel-channel adaptors 134 and 135 to receive a signal from the CPU 48 that determines whether the adaptors 134–135 are to operate in the transmit mode or receive mode. The enable wire 128 connected to each of the integrated circuit adaptors 134 and 135 is used to clock data into and out of the adaptors 134–135. A reset wire 160 is also connected to each of the adaptors 134–135 and is used to clear all registers inside the adaptors 134–135 in preparation for operation.

Integrated circuit 162 of FIG. 9 is a commercially available Intel 8212 eight bit character buffer. The four interrupt request wires 130–133 from the serial-channel adaptors 100–103 of FIG. 7 and the interrupt wires 142–145 from the parallel-channel adaptors 134 and 135 of FIG. 9 are used as the inputs to the character buffer 162. As hereinafter more fully described in subsequent portions of this specification, in response to CPU interrupt signals generated by the serial-channel adaptors 100–103 and the parallel-channel adaptors 134–135, the character buffer 162 transmits signals on data direction wire 127 and IC selection wire 160 that are used to determine which of the serial channels 80–83 or parallel channels 136–139 the information is coming from.

Referring again to FIG. 3, as previously noted, the card file 44 of the microcomputer 2 of the present invention may contain up to seven different interface circuits 50. Since each interface circuit 50 contains four serial channels 80–83 (FIG. 7) and four parallel channels 136–139 (FIG. 9) as described above, the microcomputer 2 may interface up to 56 peripheral devices to the CPU 48 of the microcomputer 2. Hence, apparatus must be provided that enables the CPU 48 to determine on which of the eight channels 80–83 or 136–139 of the seven interface circuit boards 50 data is to be sent or received.

Referring again to FIG. 9, each of the CPU interrupt wires 130–133 from the serial-channel adaptors 100–103 and the CPU interrupt wires 142–145 from the parallel-channel adaptors 134–135 are used as inputs to an OR gate 164. In response to a signal received on any one of the CPU interrupt wires 130–133 or 142–145, the OR gate, in conjunction with an inverter 166, will send a signal on channel address wire 168 to a one-of-seven card select switch generally designated 170. The channel address signal sent by the OR gate 164 and inverted by the inverter 166 will be detected by the CPU via the one-of-seven card select switch 170 which will then connect the proper interface circuit 50 to the main bus 46 (see FIG. 3) of the mother board thereby enabling one of the 56 channels from the seven interface circuits 50 to transmit data to the CPU 48. The one-of-seven card select switch is a commercially available 82-21-17 Spectrol switch.

Having generally described the portions of the interface circuit 50 which are designed to accommodate serial-channel and parallel-channel communication, attention is now directed to FIG. 6 which illustrates the portion of the interface circuit 50 used for generating and selecting the baud rate used in conjunction with the serial channels 80–83 of FIG. 7.

The CPU 48 enters an eight bit character into the interface circuit 50 through a buffer generally designated 172 connected to the main data bus 46 of the mother board by wires 262–269. After the character has been gated through the buffer 172, wires 174–181 transmit the character to the data bus 114 of FIGS. 7 and 9 and also to a secondary bus generally designated 182 of FIG. 6. The secondary data bus 182 is further comprised of eight wires 184–191.

Baud rate selection (BRS) registers 192–195 are each connected to four of the eight wires 184–191 of the secondary data bus 182. BRS registers 192 and 194 are connected to wires 184–187 which transmit the last four bits of the eight bit character. The divided character bits are baud rate selection instructions. BRS registers 193 and 195 are connected to wires 188–191 which transmit the first four bits of the eight bit character. BRS registers 192 and 193 are connected to a wire 196 and BRS registers 194 and 195 are connected to a wire 198. Wires 196 and 198 are used to transmit clock pulses to the BRS registers 192–195. As more fully described in subsequent portions of the specification, when the BRS registers 192–195 receive a clock pulse on wires 196 or 198, the four bits of the character transmitted to the respective BRS registers 192–195 are gated through the registers 192–195 and sent to multiplexers 200–203.

In addition to being connected to four of the eight bits of the character gated through BRS registers 192–198, each of the multiplexers 200–203 is also connected to eight baud rate wires 204–211. The baud rate wires 204–211 are used to transmit a plurality of baud rates (clock pulses generated at different frequencies) to each of the multiplexers 200–203. The baud rates of each of the respectively corresponding wires 204–211 is: 110 bits per second, 150 bits per second, 300 bits per second, 1200 bits per second, 1800 bits per second, 2400 bits per second, 4800 bits per second and 9600 bits per second. The above baud rates are currently used as the standard baud rates in the computer industry. Thus, any serial-channel peripheral device will generally be manufactured so as to communicate at one of these eight standard baud rates. Clearly, the baud rate generator 214 could be constructed to produce any other desired baud rate.

A crystal oscillator circuit generally designated 212 is used to provide a constant frequency signal. The signal of the oscillator circuit 212 is sent to a baud rate generator integrated circuit 214. The integrated circuit 214 is a commercially available integrated circuit manufactured by Fairchild under the name 34702 Baud Rate Generator. The baud rate generator circuit 214 divides the constant frequency signal sent by the oscillator circuit 212 into the eight standard baud rates described above. The baud rate generator circuit 214 then transmits the eight baud rates to an eight bit addressable latch 216 which is also manufactured by Fairchild. The eight baud rates are then gated through the latch 216 and sent to the multiplexers 200-203 as previously described.

Each multiplexer 200-203 in turn selects one of the eight standard baud rates which corresponds to the four bit selection instruction communicated from the baud rate selection registers 192-195. The selected baud rate is then transmitted on wires 122-125 as previously described to the serial-channel adaptors 100-103 which in turn send the information received on the data bus 114 over one of the serial channels 80-83 at the selected baud rate. In this manner, the microcomputer 2 is capable of communicating with any serial-channel peripheral device such as 38-40 (FIG. 1) at the baud rate required by that particular device.

Having generally described the portion of the interface circuit 50 dealing with baud rate generation and selection, attention is now turned to FIG. 8 which illustrates addressing and synchronization circuitry.

The CPU 48 (FIG. 3) enters data directional flow signals and a clock timing signal into the interface circuit 50 at wires 218-220, which are connected to the main bus 46 (FIG. 3). Wire 218 is used to transmit a signal indicating that information is to be received by the CPU 48. Wire 219 is used to transmit a signal indicating that information is to be sent by the CPU 48. Wire 220 is used to transmit a clock timing pulse used by the interface circuit 50 to gate control and data signals through the interface circuit 50. The data direction signals 218-219 and the clock signal 220 are each entered into a synchronization circuit indicated by the broken line box 222. The synchronization circuit 222 then outputs the data direction signals on wires 224 and 127. The clock signal is output on wire 128. The data direction and clock signals transmitted on wires 224, 127 and 128 to the portions of the interface circuit 50 illustrated in FIGS. 6, 7 and 9 are rendered compatible by the synchronization circuit 222 with the timing required by the serial-channel adaptors 100-103 (FIG. 7) and the parallel-channel adaptors 134-135 (FIG. 9). As more fully described in subsequent portions of the specification, the data direction signals transmitted on wires 224 and 127 are used to control the directional flow of information to and from the serial-channel adaptors 100-103 and parallel-channel adaptors 134-135. The signal transmitted on wire 128 is used to gate the data from bus 114 into serial-channel adaptors 100-103 and parallel-channel adaptors 134-135 in synchronization with the clock pulses of the CPU 48.

FIG. 8 also shows five wires 228-232 which, like the wires 218-220 and 238, are connected to the main data bus 46 (FIG. 3) of the mother board.

As described previously in connection with FIG. 3, the CPU 48 of the microcomputer 2 of the present invention can communicate with any one of up to seven different interface circuit boards 50. Thus, an input one-of-seven card select switch generally designated 236 is used to indicate which of the seven possible interface circuits 50 the input data is to be sent to. A card select signal is entered into the input one-of-seven card select switch 236 on one of the seven wires generally designated at 238. The signal then causes the one-of-seven card select switch 236 to connect the appropriate interface circuit 50 to the main data bus 46 (FIG. 3) thereby enabling transmission of data from the CPU 48 to one of the 56 channels of the seven interface circuits 50.

The card select signal entered at 238 from CPU 48 is transmitted by the one-of-seven card select switch through an inverter 239 to a decoder 234. Address signals entered from the CPU 48 are also transmitted on wires 228 and 229 to the decoder 234. In response to the card select signal and the address signals, the decoder 234 generates three integrated circuit selection signals which are transmitted by wires 158, 159 and 116 to the parallel-channel adaptors 134-135 and the serial-channel adaptors 100-103 respectively. As discussed previously in connection with FIGS. 7 and 9, the signals sent by decoder 234 on wires 158-159 are used in conjunction with signals sent on a combination of two of the IC selection wires 117-120 by the parallel-channel adaptors 134-135 of FIG. 9 in determining which of the adaptors 134-135 is to receive and transmit the data sent from the CPU 48. The signal sent by decoder 234 on wire 116 is used in conjunction with signals sent on a combination of two of the IC selection wires 117-120 to select one of the serial-channel adaptors 100-103 of FIG. 7 for receiving and transmitting data sent from the CPU 48.

The address signal received on wire 230 from the CPU 48 is sent to an OR gate 240. From the OR gate 240, the address signal is then bifurcated into two signals transmitted by wires 119 and 117 by connecting the wire 119 between the OR gate 240 and inverter 242. In similar fashion, the address signal transmitted on wire 231 is also bifurcated into two signals transmitted by wires 118 and 120. As indicated by the preceding paragraph, the signals transmitted on wires 117-120 and 158-159 are used to selectively transmit the data received from the CPU 48 to one of the six adaptors 100-103 and 134-135 by connecting each adaptor 100-103 and 134-135 to a unique combination of three of the seven wires 117-120 and 158-159.

The address signal transmitted by wire 232 is inverted by an inverter 244 and transmitted by wire 126. In conjunction with input and output signals transmitted on wires 224 and 127, the signal transmitted on wire 126, as discussed previously, is used in determining the directional flow of data to or from the serial and parallel channel adaptors 100-103 and 134-135.

As further illustrated in FIG. 8, a decoder 246 is connected to the integrated circuit selection wires 158, 117, 118 and 120. In response to signals sent on wires 158, 117, 118 and 120, two clock pulse signals are generated by decoder 246 and transmitted by wires 248 and 249. The clock pulse signals are then gated, along with the output signal transmitted by wire 127 from synchronization circuit 222, through AND gates 250 and 251. The AND gates 250 and 251 then send clock pulses transmitted by wires 196 and 198 to the baud rate selection registers 192-195 as described previously in connection with FIG. 6. The clock pulses in wires 196 and 198 strobe the baud rate selection data through the BRS registers 192-195 to the corresponding multiplexers 200-203.

Having completed the general overall description of the interface circuit 50, attention is next turned to the description of the method of operation and apparatus for interfacing the serial channel peripheral devices 38-40 (see FIG. 1) to the microcomputer 2.

B. Method and Operation of the Interface Circuit

At the outset, it should be noted that the interface circuit 50 of the microcomputer 2 of the present invention may be used to provide for either bi-directional communication between the CPU 48 of the microcomputer 2 and peripheral devices 38–41 (see FIG. 1) or for one-way communication between the CPU 48 of the microcomputer 2 and the peripheral devices 38–41. In the description of the remaining sections of the specification, it will be assumed that the interface circuit 50 is to be used so as to provide bi-directional communication between the microcomputer 2 and the peripheral devices 38–41.

In order to transmit data from the CPU 48 (FIG. 3) to one of the serial-channel peripheral devices 38–40 (FIG. 3 and FIG. 1), the CPU 48 enters both data and control signals into the main data bus 46 which are then transmitted to one of the seven interface circuits 50 contained in the card file 44 shown in FIG. 3. The data signals contain the information which is to be sent to one of the peripheral devices 38–40. The control signals contain information used to control the operation of the interface circuit 50. As will be hereinafter more fully described, the control signals sent by the CPU 48 are used by the interface circuit 50 to determine (1) which of the seven interface circuits 50 is to receive the data, (2) whether the data is to be sent from the interface circuit 50 to a peripheral device 38–41 or whether the information is to be sent from a peripheral device to the interface circuit, (3) whether the data is to be sent or received over a serial channel 80–83 (FIG. 7) or over a parallel channel 136–139 (FIG. 9), (4) which of the six adaptors 100–103 and 134–135 is to send or receive the data and (5) if one of the parallel-channel adaptors 134–135 is to receive the data, which of the parallel channels 136–139 is to be used to transmit the data. Data is entered into the interface circuit 50 in the form of an eight bit character in parallel format through wires 262–269 shown in FIG. 6. Control signals are entered from the CPU 48 into the interface circuit 50 through wires 218–220, 238, and 228–232 as shown in FIG. 8.

Figure 11:
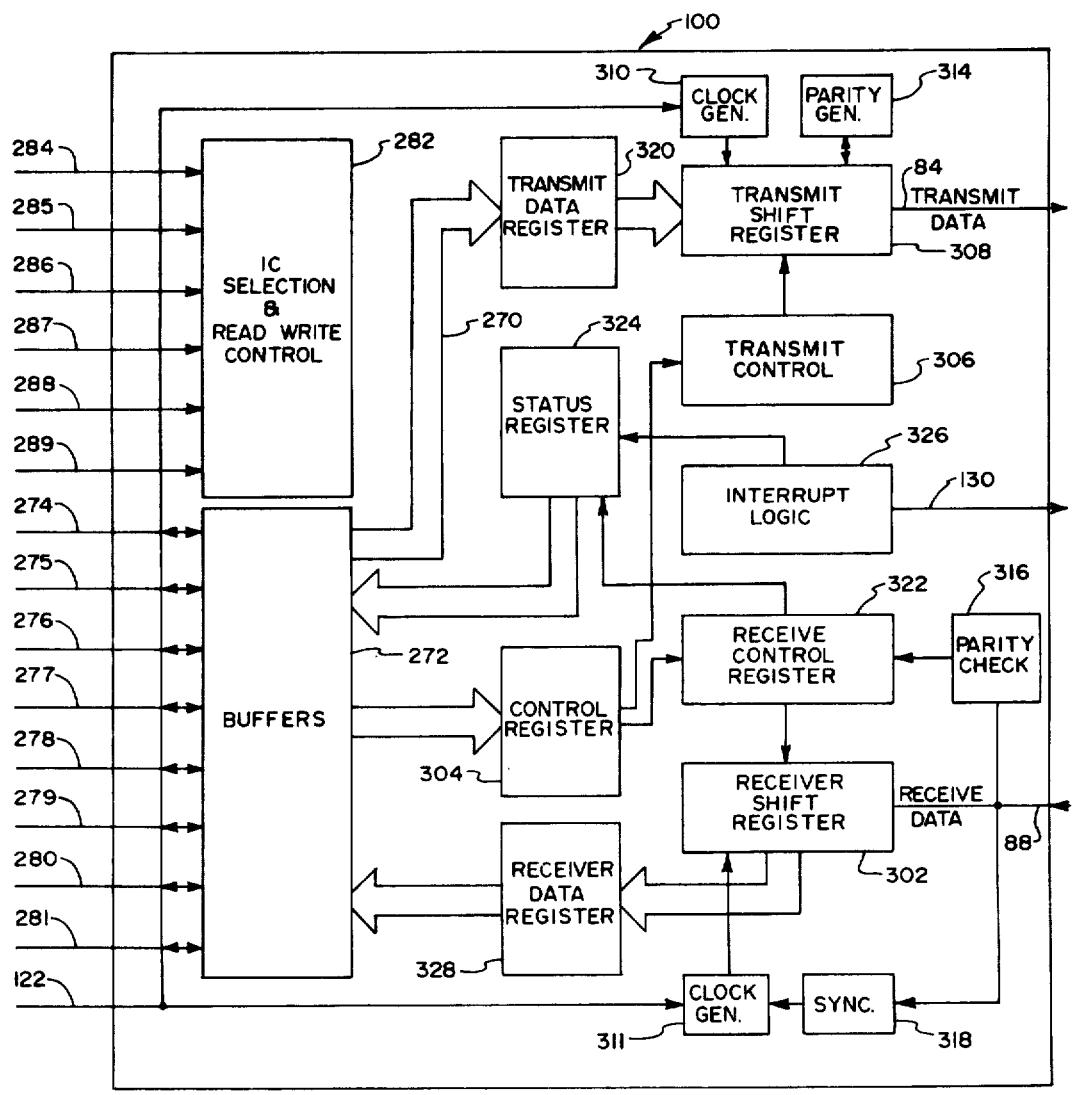
FIG. 11 is a schematic block diagram illustrating the circuitry internal to the integrated circuits of the interface circuit for accommodating serial-channel communication.

Referring now to FIG. 11, it will be seen that the serial-channel asynchronous communication interface adaptor 100 of FIG. 7 contains circuitry shown schematically by the block diagram of FIG. 11 which accommodates in the transmission mode conversion of data from parallel format to serial format. In the receiving mode, the circuitry shown schematically by the block diagram of FIG. 11 accommodates conversion of data from serial format to parallel format. In order to simplify the following portions of the description, reference will only be made to the serial-channel integrated circuit 100 and to parts of the interface circuit 50 that interact with the serial-channel integrated circuit 100. It should be understood, however, that each of the other serial-channel integrated circuits 101–103 function in a manner substantially the same as that of serial-channel integrated circuit 100.

As shown in FIG. 11, adaptor 100 contains character buffers 272 connected to the eight wires 274–281. In FIG. 7, wires 274–281 are shown connected to the data bus 114. As discussed previously in connection with FIGS. 6 and 7, the CPU 48 enters an eight bit character into the interface circuit through wires 262–269 shown in FIG. 6. The eight bit character entered from the CPU 48 is in parallel format. The eight bit character is gated through a buffer at 172 and then transmitted by the wires 174–181 to the data bus 114 of FIG. 7. In this manner, data is transmitted from the CPU 48 to the serial-channel adaptor 100. In order to transmit data from the serial-channel adaptor 100 to the CPU 48, the data is transmitted in parallel format from the buffer 272 (FIG. 11) through the wires 274–281 to the data bus 114 (FIG. 7). From the data bus 114 the data is transmitted to the Intel 8212 character buffer 104 and then back to the CPU 48 through wires 292–299.

Again referring to FIG. 11, adaptor 100 also contains logic shown schematically at 282 that accommodates the selection of the adaptor 100 by the CPU 48 and which also allows the CPU 48 to control the transmit-receive modes of operation of the adaptor 100. The IC selection and transmit-receive control logic 282 is connected to wires 284–289. Wires 284–286 are connected to a preselected combination of three out of the five integrated circuit selection wires 116–120 shown in FIG. 7. Wires 287 and 288 of FIG. 11 are connected to the two data direction wires 126 and 127 of FIG. 7. Wire 289 of FIG. 11 is connected to the enable wire 128 of FIG. 7. As discussed previously in connection with FIG. 7, the five integrated circuit selection wires 116–120 are used by the CPU 48 to select any one of the four serial-channel adaptors 100–103. The CPU 48 enters a preselected combination of four signals through wires 228–231 (FIG. 8). The circuitry of FIG. 8 then produces a preselected combination of three signals which is transmitted on the three wires 116–118 (FIGS. 8, 9 and 7) to the serial-channel adaptor 100. In this manner, the CPU 48 may selectively use adaptor 100 of FIG. 11 to communicate with a peripheral device 38–40 (see FIG. 1) whenever the CPU 48 enters the combination of signals on wires 228–231 of FIG. 8 that will produce signals on wires 116–118.

Again, as described in connection with FIG. 8, the CPU 48 enters signals through wires 219 and 232 shown in FIG. 8. The signals on these two wires are then operated upon by the circuitry shown in FIG. 8 and subsequently transmitted through data direction wires 126 and 127 (FIGS. 8, 9 and 7) to the serial-channel adaptor 100. By entering the appropriate combination of signals on wires 219 and 232 (FIG. 8), the CPU 48 is able to cause the IC selection and transmit-receive control logic 282 to selectively transmit or receive information.

The wire 289 connected to the IC selection and transmit-receive control logic 282 is connected to the enable wire 128 of FIG. 7. The enable signal transmitted by wire 128 is produced in response to a clock signal entered by the CPU 48 through wire 220 shown in FIG. 8. The enable signal transmitted to the IC selection and transmit-receive control logic 282 through wire 289 in FIG. 11 is used to gate the control signals from wires 284–288 and the data signals from wires 274–281 to the adaptor 100 in synchronization with the clock signal from the CPU 48.

Referring again to FIG. 11, in order to send the data received from the CPU 48, the data is transmitted in parallel format from the buffers 272 to a transmit data register 302 and a control register 304. Data transmitted in parallel is represented by a path as at 270. Data transmitted serially is represented by a single-line arrow as at 84. The control register 304 in turn sends a signal to a transmit control register 306. The transmit control register 306 then activates a transmit shift register 308 as soon as the data is ready to be sent. The data is transmitted in parallel format from the transmit data register 302 to the transmit shift register 308. The transfer shift register 308 converts the data from parallel format to serial format and then transmits the data in serial format over the wire 84 to the selected peripheral device 38–40 (FIG. 1). As further shown in FIG. 11, the transmit shift register 308 is driven by a clock generator 310 which in turn is connected to wire 122. As described in connection with FIGS. 6 and 7, wire 122 transmits a preselected baud rate to the integrated circuit 100 which is used to drive the clock generators 310 and 311. Thus, the transmit shift register 308 transmits the data in serial format one bit at a time at the preselected baud rate. A parity generator 314 is used set at a preselected parity in the transmitted data to permit check of the accuracy of the information.

When receiving information from a peripheral device 38–40 (FIG. 1), the data is received in serial format over wire 88. The accuracy of the data being received is checked by a parity check circuit illustrated schematically at 316. Since the incoming data is also asynchronous with respect to the timing of the interface circuit 50, synchronization logic 318 is provided to synchronize the incoming data with the timing required by the interface circuit 50. The serial format data is received in a receive shift register 320 and held until a signal is received from a receive control register 322. The receive control register 322 waits to signal the receive shift register 320 until notified by a status register 324 that the interrupt CPU logic 326 has interrupted operation of the CPU 48 (FIG. 3). Once the operation of the CPU 48 has been interrupted by the interrupt logic 326, the status register 324 is notified which in turn notifies the receive control register 322. A signal is then sent to receive shift register 320, causing the data residing in the receive shift register to be sent to a receive data register 328. The data is then sent in parallel format from the receive data register 328 to the buffers 272 and from the buffers 272 through the wires 274–281 to the data bus 114 shown in FIG. 7. From the data bus 114 the information is transmitted to the character buffer 104 back to the CPU 48 through wires 292–299 as described earlier.

Figure 12:
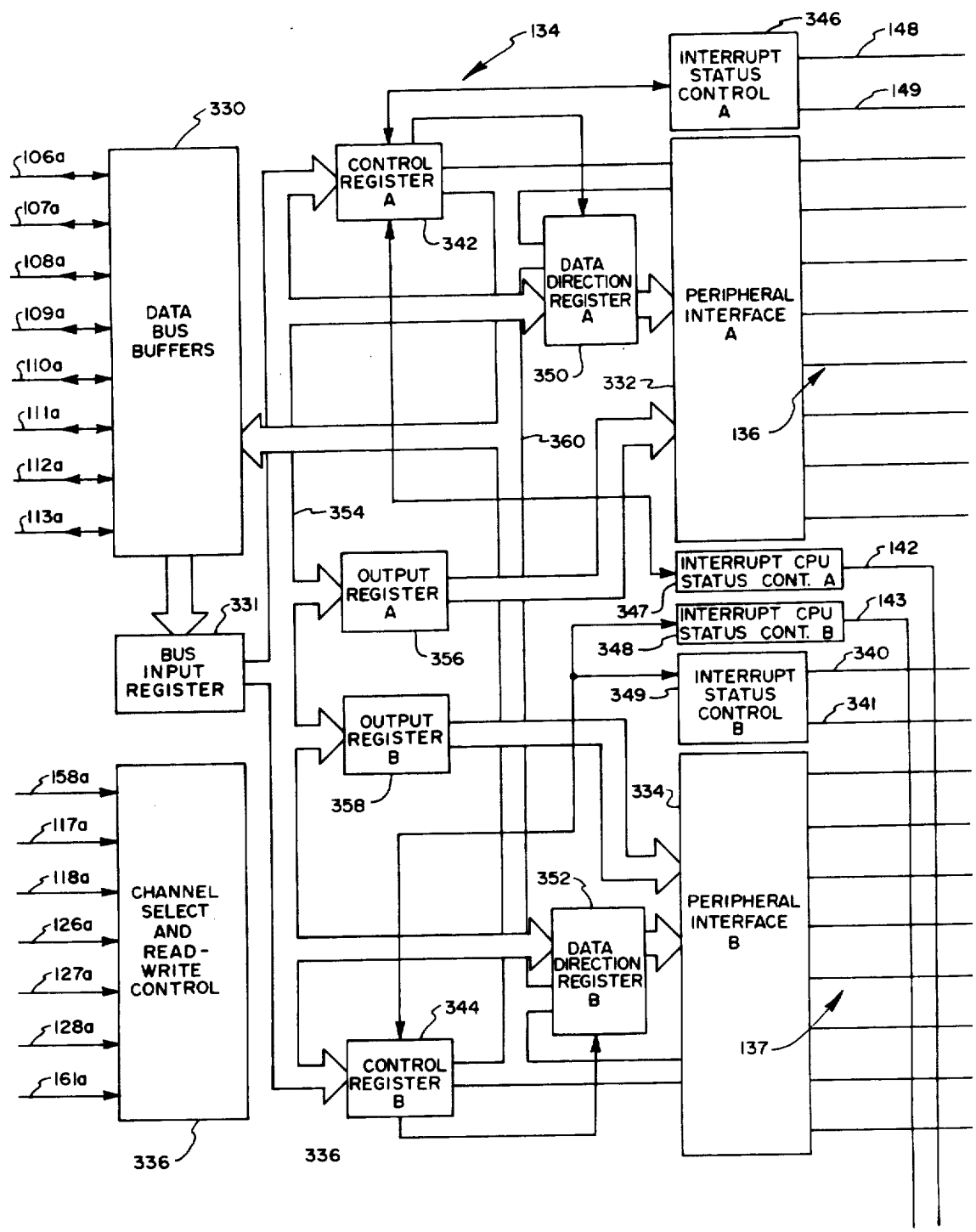
FIG. 12 is a schematic block diagram illustrating the circuitry internal to the integrated circuits of the interface circuit for accommodating parallel-channel communication.

Referring now to FIG. 12, attention is focused on the method and apparatus of the interface circuit 50 for interfacing parallel-channel peripheral devices such as 41 (FIG. 1).

Transmission of data is effected in part by the peripheral interface adaptors 134 and 135 (FIG. 9). Because adaptors 134 and 135 are substantially identical, and for convenience of illustration, the following disclosure will focus primarily on the structure and operation of adaptor 134. FIG. 12 schematically illustrates the circuitry of the adaptor 134. It is noted at the outset that the adaptor 134 (and also adaptor 135) are integrated circuits, each having two parallel-channel outputs. Thus, the adaptor 134 provides two parallel channels. To bifurcate the adaptors so as to provide a single parallel channel for each adaptor is clearly within the purview of one of ordinary skill in the art.

Understanding the structure and operation of parallel-channel adaptor 134 is best accomplished by making simultaneous reference to both FIGS. 9 and 12. The wires 106–113 of the data bus 114 transmit the data by direct wire connection along wires 106a–113a to the data bus buffers 330. The data in the buffers 330 is exchanged between the peripheral interface A 332 or peripheral interface B 334 as determined by the channel select and read-write control 336.

The channel select and read-write control circuit 336 is connected by wires 158a and 117a to selection wires 158 and 117 (see FIG. 9). The control circuit 336 is further connected by wires 118a to the IC selection wire 118 and is similarly connected to data direction wires 126 and 127 by corresponding wires 126a and 127a. The enable pulse is the timing signal transmitted through line 128 from the timing synchronization circuit 222 (see FIG. 8) and communication with the adapter 134 is accomplished through wire 128a. The enable pulse in 128a is the only timing signal that is supplied to the adaptor 134 and timing of all other signals is referenced to the leading and/or trailing edges of the enable pulse in line 128a. All registers in the adapter 134 are reset as a result of a signal in wire 161a connected to reset wire 161 (see FIG. 9).

Each of the peripheral data channels 136 and 137 (FIG. 9) can be programmed to act as an input or output. This is accomplished by setting a data directional flag in the data direction registers 350 and 352 (FIG. 12). The data direction registers 350 and 352 allow the CPU 48 to determine the direction of data flow through the data channels 136 or 137. The state of the data direction registers 350 and 352 is controlled by the corresponding control registers 342 and 344. Control registers 342 and 344 are in turn controlled by the CPU 48 through the parallel channel peripheral control lines 148–149 and 340–341. In addition, the control registers 342 and 344 allow the CPU 48 to enable the interrupt lines 142 and 143 and to monitor the status of interrupt flags. Input lines 148 and 340 are input only lines that set the interrupt flags in the control registers 342 and 344. Selection of peripheral interface register 332 or data direction register 350 is made when the proper register select signals are applied to the channel select and read-write control by memory address signals in wires 126a and 118a.

The data output registers 356 and 358 transmit data from the CPU data input bus lines 354 to the corresponding channels 136 and 137 through respective peripheral interface registers 332 and 334. Data in the output register 356, for example, will be transmitted to the serial channel 136 when the serial channel 136 is in the output mode. When the serial channel 136 is in the input mode as determined by the data direction register 350, the data will be transmitted through the bus 360 and into the data bus buffers 330.

Summarizing the operation of the circuit described in FIG. 12, data from the bus 114 (FIG. 9) will be transmitted to the data bus buffers 330. In order for the data to be transmitted through the data bus buffers 330 for processing in the adapter 134 (FIG. 9), it must be ascertained that one of the adaptors 134 or 135 has been selected and, further, assuming that the adaptor 134 is selected, the appropriate output channel 136 or 137 is selected. This address selection is made through the channel select and read-write control 336 (FIG. 12). Input signals on wires 117a and 158a together with a coincident signal in wire 160 (see FIG. 9) will select adaptor 134. A proper combination of high and low signals in wires 118a and 126a will select output register 356 and control register 342.

After address selection, the data will be gated through the parallel channel 136 in the direction determined by the signal in the data direction wire 127a which controls the state of the data direction register 350 through the control register 342. The data will be transmitted when the control signals are coincident with an enable pulse in line 128a.

Communication with the CPU 48 (FIG. 3) requires an active interrupt request through lines 142 and 143 either directly or through interrupt priority circuitry 346-349. Each interrupt status control register 346 and 349 has two internal interrupt flag bits, each of which is associated with a particular peripheral interrupt line 148, 149, 340 and 341. Servicing an interrupt by the CPU 48 may be accomplished by a program routine that, on a prioritized basis, sequentially reads and tests the control registers 342 and 344 for the flag bits that are set.

3. Relative Time Clock

Figure 5:
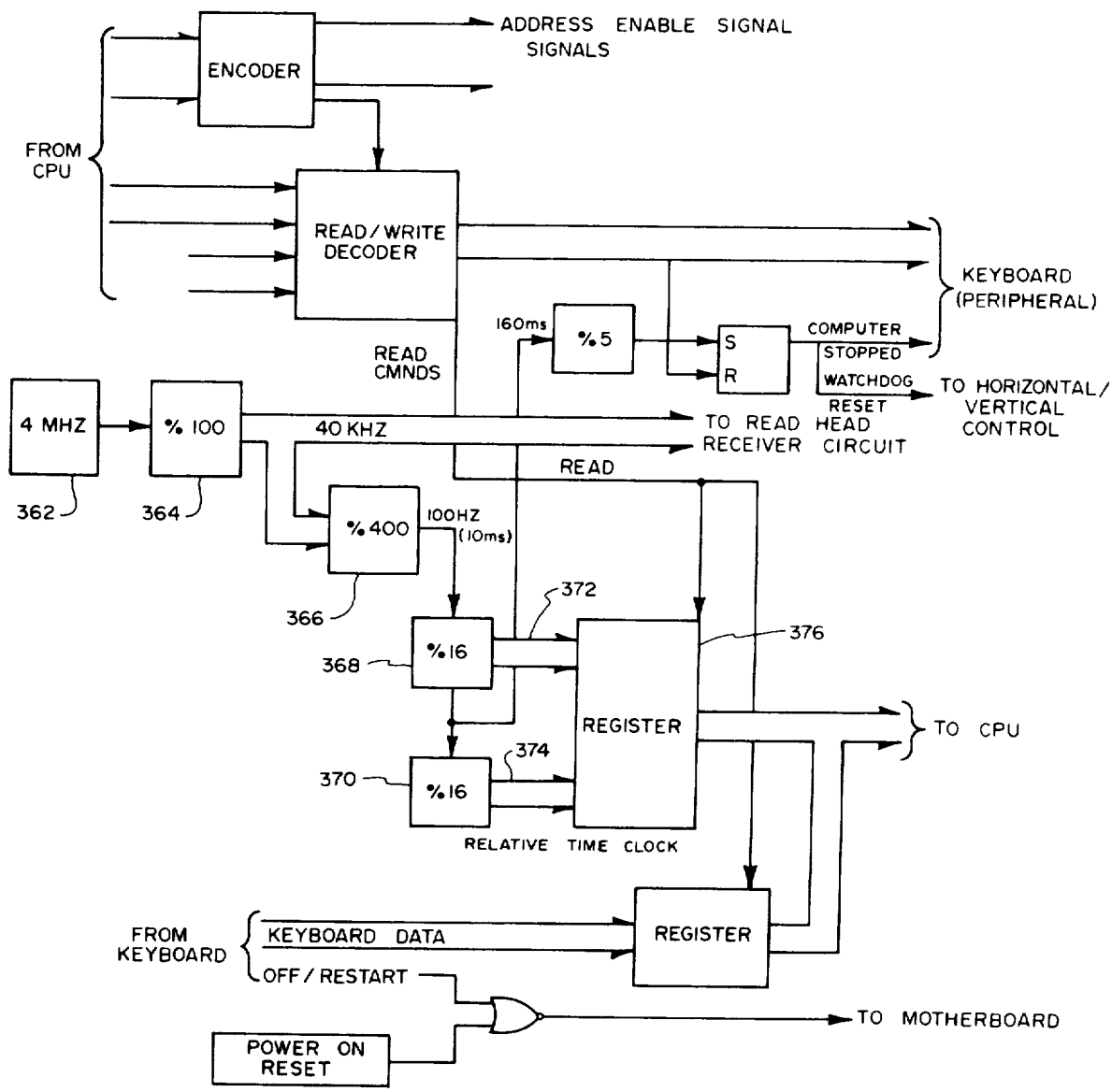
FIG. 5 is a schematic diagram illustrating in part the relative time clock circuit.

Having described the interface of peripheral devices to the CPU and the interaction thereof with the S/R vehicle 10 shown in FIG. 1, attention is now directed to the relative time clock circuitry and method in conjunction with the RAM/PROM memory circuit 49. The structure and method described can best be understood by reference to FIGS. 4 and 5.

In operating the S/R vehicle 10 and the materials handling system in general, it has been found highly desirable to continuously monitor the time necessary to execute a selected task. If the selected task is not completed within a predetermined time increment, it can reasonably be assumed that a malfunction exists which justifies shutdown of the S/R machine and related structure. Representative of the various tasks which may be timed include horizontal displacement of the S/R machine 10, vertical displacement of the lift plate shuttle 18, the extractor operation and others. For each task to be timed, a timer is established via the random access memory 64 (FIG. 4). The operating programs established in PROMS 60 or 62 to execute each task loads the corresponding timer in the RAM 64 with a number. The number is determined by dividing the time required to complete the task by a time base.

The time base is a series of electronic timing pulses which systematically decrement the timers in RAM 64. The time base is generated by the relative time clock illustrated in FIG. 5.

The 4 MHz clock 362 is reduced to 40 KHz by a divider circuit 364. The 40 KHz output is communicated to the read head receiver circuit 53 (See FIG. 3). The 40 KHz output is divided by 400 in divider circuit 366 and thereby reduced to 100 Hz. The 100 Hz clock signal then passes through 2 divide by 16 circuits 368 and 370, the divider 368 and the divider 370 each having a four line output 372 and 374, respectively. The divider clock pulses are accumulated in register 376 where the clock pulses are gated in eight wires to the data bus of the CPU. By way of illustration, the outputs of the relative time clock provide the following time basis: 20, 40, 80, 160, 320, 640, 1280 and 2560 milliseconds.

Referring again to FIG. 4, the PROM 60 or 62 is provided with a timer decrement routine which selects one of the time base outputs from the relative time clock for each timer in the RAM 64. Each transition of the selected time base decrements each non-zero timer in the RAM 64. Accordingly, each subroutine which controls the operation of the horizontal, vertical or extraction or other task of the S/R machine merely looks at the corresponding timer in RAM 64. The task will be completed and the electronic operating commands initiated as long as the time in RAM 64 is non-zero. However, when the time in the RAM 64 has been decremented to 0, the operating commands will be inhibited and the S/R machine rendered inoperative.

From the foregoing, it is apparent that the microcomputer of the present invention provides a wide range of flexibility and safety in a surprisingly effective way. Any number of peripheral devices, whether serial or parallel and susceptible to transmission or reception at any desired baud rate can be interfaced to the microcomputer 2 by merely attaching the peripheral device 38 to the interface circuit 50 and entering software in the PROM 60 or 62 to permit the CPU to communicate with the peripheral through the interface. Rewiring of the interface 50 or the CPU 48 is unnecessary.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An interface circuit for interfacing a plurality of serial channel peripheral devices to a CPU of a microcomputer, the interface circuit having a plurality of serial channels and further comprising:
   means for simultaneously generating a plurality of baud rates;
   a plurality of means electrically connected to the generating means for selecting a predetermined one of the baud rates, each of said selecting means having means for communicating a predetermined one of the baud rates to one of the serial channels;
   means electrically connected to each selecting means for gating data serially over one of the serial channels at the selected baud rate to one of the serial channel peripheral devices; and
   means for communicating data from the CPU to each gating means.

2. An interface circuit as defined in claim 1 wherein said generating means comprises a frequency generating crystal and at least one frequency divider for outputting a plurality of frequencies.

3. An interface circuit as defined in claim 2 wherein said plurality of frequencies comprise at least multiples of the following frequencies expressed in Hz: 110, 150, 300, 1200, 1800, 2400, 4800 and 9600.

4. An interface circuit as defined in claim 1 wherein each said selecting means comprises a baud rate selection register into which baud rate selection data is loaded from the CPU, each said selecting means further comprising a multiplexer for receiving the plurality of baud rates from the generating means and also receiving output from the baud rate selection register, the multiplexer transmitting one of the plurality of baud rates to one of the gating means in response to the output from the baud rate selection register.

5. An interface circuit as defined in claim 1 wherein each said gating means comprises an asynchronous communication interface adaptor into which output data and control data is selectively loaded from the CPU, the interface circuit further comprising means for communicating output and control data to each adaptor, each said adaptor comprising means for enabling the adaptor to send the output data over the serial channel at the selected baud rate to the peripheral device in response to the control data.

6. An interface circuit for interfacing a microcomputer having a CPU to at least two distinct peripheral devices, each peripheral device communicating serially with the interface circuit over one of a plurality of output channels provided in the interface circuit, the interface circuit further comprising in combination:

a baud rate selection register and means for communicating baud rate selection data from the CPU to the baud rate selection register;

a baud rate generator for generating a plurality of baud rates;

a clock generator;

transmitting means electrically connected to the baud rate generator, baud rate selection register and clock generator, said transmitting means responding to the data in the baud rate selection register so as to transmit a selected one of the plurality of generated baud rates to the clock generator, thereby driving the clock generator at the selected baud rate;

means for enabling one of the output channels, the enabling means comprising a channel select circuit and means for communicating address data from the CPU to the channel select circuit so as to permit the channel select circuit to enable a predetermined one of the output channels in response to a preselected combination of address signals from the CPU;

means for converting parallel format data from the CPU to serial format data, said converting means also being electrically connected to the clock generator and comprising means responsive to the clock generator for gating the serial format data over the selected output channel at the selected baud rate to a peripheral device; and means for communicating the parallel format data from the CPU to the converting means.

7. An interface circuit as defined in claim 6 wherein said transmitting means comprises a multiplexer circuit which receives the output of the baud rate generator; means for communicating the baud rate selection data from the baud rate selection register to the multiplexer; and means for isolating the selected baud rate so that only the selected baud rate is communicated to the clock generator.

8. An interface circuit as defined in claim 6 wherein said means for gating the serial format data over the selected output channel comprises a photo coupler for optically isolating the transmitted data.

9. An interface circuit for a microcomputer having a CPU which communicates only in parallel, said interface circuit interfacing the CPU to at least two peripheral devices, one of the peripheral devices communicating serially with the interface circuit and the other peripheral device communicating in parallel with the interface circuit, the interface circuit having at least one serial channel for accommodating serial communication in both the transmit and receive modes and at least one parallel channel for accommodating parallel communication in both the transmit and receive modes, said interface circuit further comprising:

a serial channel integrated circuit adaptor connected to the serial channel, said adaptor comprising means for receiving address and read-write control signals from the CPU and means for communicating data between the CPU and serial channel peripheral device, said communicating means comprising means for two-way conversion of data format between parallel format and serial format;

a parallel channel integrated circuit adaptor connected to the parallel channel, said adaptor comprising means for receiving address and read-write control signals from the CPU and means for communicating parallel format data between the CPU and parallel communicating peripheral device;

means for selecting one of the channels for communicating data between the CPU and one of the peripheral devices, said selecting means comprising means for transmitting address signals from the CPU to the address signal receiving means of each adaptor, the address signals comprising a unique code effective to enable a predetermined one of the channels to communicate data between the CPU and one of the peripheral devices, said selecting means further comprising means for transmitting the read-write control signal from the CPU to the read-write signal receiving means of each adaptor, the read-write signal determining one of the transmit and receive modes for the selected channel;

a baud rate generator for generating a plurality of baud rates; and means electrically connected to the baud rate generator for selecting a predetermined one of the baud rates, said baud rate selecting means being also connected to the two-way data format conversion means so as to accommodate serial communication between the CPU and the serial channel peripheral device at the selected baud rate when the serial channel has been selected for communication.

10. An interface circuit for interfacing a microcomputer having a CPU to a plurality of serial-channel peripheral devices and a purality of parallel-channel peripheral devices, the interface circuit having a plurality of serial channels and a plurality of parallel channels and further comprising:

means for generating a plurality of baud rates;

an interface adaptor for each serial channel, the interface adaptor comprising means for receiving both output data and control data from the CPU in parallel format, said adaptor further comprising means for converting parallel format data to serial format data, and a clock generator electrically connected to said converting means, the clock generator gating serial format data through the converting means onto a selected serial channel at a preselected baud rate;

a baud rate selection register;

means for transmitting baud rate selection data from the CPU to the baud rate selection register;

multiplexing means electrically connected to the baud rate generating means, baud rate selection register, and the clock generator, said multiplexing means responding to the data in the baud rate selection register so as to transmit a selected one of the plurality of generated baud rates to the clock generator, thereby driving the clock generator at the selected baud rate;

a parallel channel adaptor comprising means for receiving both output data and control data from the CPU in parallel format, said adaptor further comprising gating means electrically connected to said receiving means for gating parallel format data onto a selected parallel channel;

means for communicating output data from the CPU to each adaptor; and means for communicating control data from the CPU to each adaptor, said control data comprising a preselected combination of address signals which will enable the data receiving means of only one adaptor at a time to receive output data from the CPU.

11. An interface circuit for interfacing a CPU as defined in claim 10 further comprising means for receiving input data from said peripheral devices, means for determining the direction of data travel between the CPU and the peripheral devices, said determining means comprising interrupt logic for selectively accessing the CPU when the interface circuit is ready to transmit or receive data, and means connected to said determining means for communicating a read-write control signal from the CPU to the determining means.

12. An interface circuit as defined in claim 10 wherein one of the said plurality of parallel-channel peripheral devices is a CPU of a second, remote microcomputer.

13. A method of interfacing a CPU through an interface circuit having a plurality of serial channels to a plurality of serially communicating peripheral devices, each peripheral device being designed to operate at a predetermined baud rate, the method comprising the steps of:
simultaneously generating a plurality of baud rates in the interface circuit;
selecting a baud rate for each serial channel that is compatible with the design of the peripheral device communicating over that channel;
communicating data from the CPU to each serial channel in the interface circuit;
enabling one of the serial channels; and
serially gating the data at the selected baud rate over the enabled serial channel to one of the peripheral devices.

14. A method as defined in claim 13 wherein said selecting step comprises transmitting baud rate selection data from the CPU to the interface circuit, the interface circuit thereafter responding to the data so as to select a baud rate for each serial channel that is compatible with the design of the peripheral device that communicates over that channel.

15. A method of interfacing a CPU of a microcomputer through an interface circuit having a plurality of both serial and parallel bi-directional data channels to a plurality of both parallel and serial channel peripheral devices, the method comprising the steps of:
sending address and read-write instruction signals to both the serial and parallel data channels;
selecting one of the data channels for communicating data between the CPU and one of the peripheral devices, said selecting step comprising enabling only one of the serial or parallel data channels in response to the address instruction signals;
determining the directional flow of data between the CPU and one of the peripheral devices in response to the read-write instruction signals;
simultaneously generating a plurality of baud rates;
selecting a baud rate for each serial channel that is compatible with the design of the peripheral device communicating over that channel; and
communicating the data through the enabled data channel in the selected direction, said data communicating step comprising communicating data at the selected baud rate whenever a serial channel is enabled.

16. A method of interfacing a CPU through an interface circuit having a plurality of both serial and parallel data channels, each channel comprising an interface adaptor, the interface circuit further having a baud rate generator, a plurality of multiplexers connected to the output of the baud rate generator, and a timing clock internal to each serial channel adaptor and connected to the output of one of the multiplexers, the CPU being interfaced to a plurality of serial and parallel channel peripheral devices, and the method comprising the steps of:
communicating address data from the CPU to each of the interface adaptors, and enabling a preselected one of the adaptors in response to the address data;
generating a plurality of baud rates and communicating the plurality of baud rates to the multiplexers;
transmitting baud rate selection instructions from the CPU to the multiplexers and thereafter transmitting from one of the multiplexers a selected one of the plurality of baud rates to the timing clock internal of a corresponding adaptor so as to drive the clock at the selected baud rate; and
communicating data between the peripheral device and the microcomputer through the selected interface adaptor, said data being communicated at the selected baud rate by the timing clock when a serial channel adaptor is enabled.

17. A method as defined in claim 16 further comprising generating a read-write signal and instructing the enabled adaptor as to the direction of data transfer in accordance with the state of the read-write signal.

18. An interface circuit for interfacing a plurality of serial channel peripheral devices to a CPU of a microcomputer, the interface circuit having a plurality of serial channels and further comprising:
means for simultaneously generating a plurality of baud rates;
a plurality of means electrically connected to the generating means for selecting a predetermined one of the baud rates, each of said selecting means having means for communicating a predetermined one of the baud rates to one of the serial channels;
means electrically connected to each selecting means for serially receiving data from one of the peripheral devices at the selected baud rate over one of the serial channels; and
means for communicating the data from the interface circuit to the CPU.

19. A method of interfacing a CPU through an interface circuit having a plurality of serial channels to a plurality of serially communicating peripheral devices, each peripheral device being designed to operate at a predetermined baud rate, the method comprising the steps of:
simultaneously generating a plurality of baud rates in the interface circuit;
selecting a baud rate for each serial channel that is compatible with the design of the peripheral device communicating over that channel;
enabling one of the serial channels;
receiving data serially into the interface circuit at the selected compatible baud rate, the data being sent from one of the peripheral devices; and
communicating the data from the interface circuit to the CPU.

* * * * *